(12) United States Patent
Koch (10) Patent No.: US 7,287,939 B2
(45) Date of Patent: Oct. 30, 2007

(54) METHOD FOR CONTROLLING RELATIVE DISPLACEMENTS OF A TOOL AGAINST A WORKPIECE

(76) Inventor: Josef Koch, Pognerstrasse 21, D-81379 Munich (DE)

( * ) Notice: Subject to any disclaimer, the term of this patent is extended or adjusted under 35 U.S.C. 154(b) by 0 days.

(21) Appl. No.: 10/543,727

(22) PCT Filed: Jan. 29, 2003

(86) PCT No.: PCT/DE03/00229

§ 371 (c)(1),
(2), (4) Date: Jun. 13, 2006

(87) PCT Pub. No.: WO2004/070483

PCT Pub. Date: Aug. 19, 2004

(65) Prior Publication Data

US 2006/0291969 A1   Dec. 28, 2006

(51) Int. Cl.
*B23C 3/18* (2006.01)
*B23C 3/04* (2006.01)
*G05B 19/19* (2006.01)

(52) U.S. Cl. ............... 409/132; 409/80; 409/84; 409/120; 409/167; 409/199; 29/889.7; 700/187; 700/190

(58) Field of Classification Search ............... 409/132, 409/131, 79, 80, 84, 119, 120, 165, 166, 167, 409/199; 29/889, 889.23, 889.6, 889.7, 27 C; 700/187, 190; 318/569, 570
See application file for complete search history.

(56) References Cited

U.S. PATENT DOCUMENTS

| | | | | |
|---|---|---|---|---|
| 3,460,435 A | * | 8/1969 | Dahl et al. | 409/183 |
| 5,020,001 A | * | 5/1991 | Yamamoto et al. | 700/247 |
| 5,090,851 A | * | 2/1992 | White | 409/199 |
| 5,378,091 A | * | 1/1995 | Nakamura | 409/132 |
| 5,595,463 A | * | 1/1997 | Takegahara et al. | 409/132 |
| 6,097,168 A | * | 8/2000 | Katoh et al. | 318/568.11 |
| 6,357,977 B1 | * | 3/2002 | Momochi et al. | 409/132 |
| 6,491,482 B1 | * | 12/2002 | Fenkl et al. | 409/132 |
| 6,554,551 B1 | * | 4/2003 | Marelli | 409/201 |
| 6,566,835 B1 | * | 5/2003 | Yoshida et al. | 318/569 |
| 6,601,484 B1 | * | 8/2003 | Katoh et al. | 409/132 |
| 6,775,586 B2 | * | 8/2004 | Shibata et al. | 700/189 |
| 6,988,860 B2 | * | 1/2006 | Ishii et al. | 409/132 |

(Continued)

FOREIGN PATENT DOCUMENTS

DE    4309874 A1 *  9/1993

*Primary Examiner*—Dana Ross
(74) *Attorney, Agent, or Firm*—Andrew Wilford (57) ABSTRACT

Relative movements of a tool and a workpiece are controlled by moving a tool axis in all spatial dimensions for the material-removal machining of the workpiece to produce a desired target contour of the workpiece by a sequence of relative movements along a tool trajectory of the tool. The tool trajectory is subdivided into a multiplicity of target segments along which the tool is in engagement with the workpiece so that the orientation of the tool axis is consistent within a target segment, while the orientation of the tool axis is variable over the entire tool trajectory, and a respective end point of a target segment is connected by a linking pivot movement, during which the tool does not engage the workpiece and in which the orientation of the tool axis is altered, with a starting point of a further target segment.

30 Claims, 6 Drawing Sheets

U.S. PATENT DOCUMENTS 7,021,873 B2 * 4/2006 Chihara et al. ............. 409/132
2001/0043842 A1 * 11/2001 Kaule et al. ................ 409/132
2001/0046422 A1 * 11/2001 Colombo .................... 409/201

* cited by examiner

METHOD FOR CONTROLLING RELATIVE DISPLACEMENTS OF A TOOL AGAINST A WORKPIECE

CROSS REFERENCE TO RELATED APPLICATIONS

This application is the U.S. national phase of PCT application PCT/DE2003/000229 filed 29 Jan. 2003 with a claim to the priority of PCT patent application PCT/DE2003/000229 itself filed 29 Jan. 2003.

FIELD OF THE INVENTION

The invention relates to a method of controlling relative displacements of a tool, especially a milling tool, a tool for the shape removal machining, or the like, against or with respect to a workpiece in which a tool axis can be swung or shiftable in all spatial dimensions for the material-removal machining of the workpiece and in which a desired target control of the workpiece is produced by a sequence of relative movements along a tool target of the tool.

BACKGROUND OF THE INVENTION

In known processes for the shape removal machining of workpieces as are used, for example, in milling processes in machine tool and shaping, the workpiece, which is to be machined to a desired contour in the fabrication processes, is machined with a milling head of a milling machine in a shape-removal procedure. Processes are known in which the reactive movement between the relating mill head and the workpiece to be machined is possible along three linear axes. These three linear axes are typically at angles of 90° to one another and define an orthogonal three-axis coordinate system.

For the machining of more complicated workpiece shapes, especially shapes with deep cavities and/or with undercuts, such three-axis strategies in which the rotating tool is maintained systematically perpendicular to a planar main machining plane are, however, often not sufficient. This, in not the least problem, can permit collisions in regions of steeper geometry of the workpiece between the workpiece and the rotating tool, or its tool holder, or other machine elements.

To avoid such collisions or to enable improvement in the cutting conditions, three-axis relative movements between the tool and the workpiece often are not longer sufficient. For these cases, machining processes are known in which, by providing additional pivotal movements of the workpiece and/or the tool about one or more pivot axes, the machining can be improved. The provision of the two additional pivotal axes of the machine enables the tool to assume orientations which are not orthogonal to the axes of the cartesian machine coordinate system. Depending upon the number of these additional rotary or pivotal axes, one may have reference to 4-axis or 5-axis machining or, alternately, also to 3+1 axes or 3+2 axes machining. In these cases, a machine-specific formulation of a (NC) or Numerical Control program is required. Independently from the kinematics of the machine, the inclined orientation of the tool to the workpiece can also be described by a unit vector of the tool orientation which enables programming in a machine-independent mode. For this purpose in the program of the angle of the unit feature, or the axis for the tool orientation, the programming requires explicitly defining each point for the machining operation.

To establish a collision-free 5-axis machining program, initially a calculation is made without an inclined positioning of the rotatable tool, after which, to avoid collisions between the tool and the workpiece, the angle required is integrated subsequently in the program for the requisite position of the tool. The tool setting required for the collision-free machining can either be estimated for the critical regions which may occur, determined by CAD programs, or established by so-called "teaching" in testing of the machining program on the machine. Advantageously, in this method, a relatively simple arrangement of adjoining machining regions is provided so that the controls of the machining paths can be controlled relatively well. Nevertheless, the system requires comparatively high costs to ensure collision-free machining since the movement paths of the tool and workpiece holder must either be tested on a point-by-point basis, or must be simulated using additional simulation software, or both.

In a further machining method for segmentwise fixed tool settings, the machining operation is calculated with a corresponding tilted coordinate system which can result in a tested collision-free operation over an entire machining region. However, for this method a secondary higher cost must be taken into consideration because of the need for more complex machining segments with the collision-free settings that frequently can only be determined by iterative processes. As a consequence, the overall controlling of the pattern of the machining paths is more difficult.

An alternative to the described methods is the creation of so-called 5-axis simultaneous programs, that is, machining programs in which simultaneous movements of the machine tool, both along the linear axis and also the pivotal axis, are created. In this case, the setting of the rotating tool can be varied permanently with its advance along its machining path.

The problems in this process lie less in the theoretical concepts than in the limitations of the machine tool which is generally used because their mechanical, or control, and regulation technology characteristics frequently do not afford the requisite machining processions or supply the desired machining qualities. Thus, with simultaneous 5-axis machining by presently available machining technology, there are very narrow limitations. The kinetic configuration of the machine tools typically require heavy machine tools and frequently large spacings between the pivot axes and the workpieces so that, even in the construction of the tool, the smallest imperfections in the movement patterns of the rotating tool can have a significant negative effect on the processes of the machining results. The inertia of the moving masses of the pivotal toolhead also can have a negative effect on the dimensional stability in the machining of the workpiece. Thus, for example, control errors in the segment of minutes of a degree can lead to deviations in the workpiece contour of several tenths of a mm. In machine tool operations, typical precisions only in the range of 0.005 mm to up to 0.03 mm may be tolerable. As a result, the suitability of such machines for 5-axis simultaneous machining is greatly limited.

OBJECT OF THE INVENTION

The object of the invention is to provide a method of controlling relative movements of a tool against a workpiece which will yield a high machining quality with minimum tolerance deviations to overcome the drawbacks of the art.

SUMMARY OF THE INVENTION

This object of the invention is achieved with a method of controlling relative movement of a tool against a workpiece, in which the tool is provided along a tool axis which can be shifted or swung in all spatial dimensions relative to or against the workpiece for material-removal machining and of making a desired target contour in the workpiece by a sequence of relative movements along a tool track or trajectory of the tool.

According to the invention, the tool track or trajectory is subdivided into a multiplicity of track or trajectory segments along the track and along which the tool is in engagement with the workpiece. The orientation of the tool axis remains constant within a track segment while it is variable over the entire tool path. An end point of a path or trajectory segment is always connected via a connecting or linking pivot movement with a starting point of a subsequent track or trajectory segment. During the connecting or linking pivot movement, the tool finds itself not in engagement with the workpiece, for example, is disengaged from the workpiece.

The method according to the invention has the advantage that it permits collision-free machining since a segmentwise fixed setting of the tool is permitted. This method has the advantage that it can provide substantially precise results for many machine tool and measurement machines and better results than those hitherto obtained in operating with the 5-axis simultaneous method.

According to one embodiment of the method, the relative movement of the tool with respect to the workpiece is carried out by linear movements of the workpiece in three different longitudinal directions, together with pivotal movement of the tool about two different pivot axes. This kind of relative movement of the tool with respect to the workpiece enables the use of the method of the invention on conventional machine tools as are used in large number. With a milling machine as the machine tool, the workpiece affixed to the table can be shifted into different horizontal directions. The third direction in which the table is to be shifted is the vertical direction. The milling head, together with its tool holder can be swung about two pivot axes with a so-called "5-axis mill", the two pivot axes being preferably orthogonal to one another.

According to an alternative embodiment method, the relative movements of the tool against the workpiece are effected by linear movements of the workpiece in two different longitudinal directions together with pivotal movements of the tool about two different pivot axes, together with a linear movement of the tool in a third longitudinal direction. This type of movement control can be used also with a wide variety of machine tools. For example, with the milling machine, the workpiece is mounted upon the table can be shifted therewith in two different horizontal directions. The milling head, together with its tool holder can, with a so-called "5-axis mill" be pivoted about two pivot axes which are preferably arranged orthogonally to one another. The milling head can additionally be shifted in the vertical direction.

According to a further alternative embodiment of the method, the relative movements of the tool, with respect to the workpiece, are effected by linear movements of the tool in three different longitudinal directions together with pivotal movements of the workpiece about two different pivot axes. This kind of control of the movements is especially advantageous when the workpiece and its holder is substantially smaller and lighter than the tool with its tool holder.

According to a further alternative embodiment of the method, the relative movement of the tool with respect to the workpiece is carried out by linear movements of the workpiece in two different longitudinal directions together with pivotal movements of the workpiece about two different pivot axes. In this approach, exclusively the workpiece is pivoted or swung while the tool, together with its holder, remains fixed. This kind of movement control can be advantageous with such machines in which the tool must be subjected to a minimum amount of chatter or vibration and may be subject to accelerations as is the case, for example, with optical devices.

A further alternative embodiment of the method according to the invention provides that the relative movement of the tool with respect to the workpiece be effected by pivotal movements of the workpiece which may be held by at least three linear shiftable suspensions. This type of machine tool is known as a so-called "hexapod" machine in which the table, together with the workpiece affixed thereto, is supported on six points. At each of these six support points, by means of respective ball joints, a linear hydraulic cylinder is affixed. These six so-called "hydraulic linear motors" are, at their respective other ends, also fixed by ball joints to a foundation of the machine. By mutually related extensions and retractions of the hydraulic cylinders, 5-axis relative movements between tool (for example, a milling cutter, a laser, or the like) and the workpiece can be generated. For the support of the table at least three linear drives are required: in its broadest sense, it is possible to utilize the support with six linear drives.

A preferred mode of the method utilizes a milling cutter as the tool for machining the workpiece. This is, by far, the widest application in the machine tool field and in carrying out the method of the invention, such machines can be utilized even though, because of their structure limitations, often a high precision 5-axis simultaneous machining is not possible.

An alternative configuration of the invention provides a laser head as a tool for machining the workpiece. Here the method of the invention also affords a number of advantages since it enables the use of relatively inexpensive machine tools with simple construction to produce machining results of higher precision. A typical application is, for example, the laser machining of a forging die for the production of steering knuckles. This machining can be carried out by a material removal utilizing the so-called "laser caving" which removes the material from the workpiece to be machined layer by layer by evaporation to the desired dimensions. A further possibility of laser machining is so-called "laser welding", in which an application-type machining is carried out. In this case, material layers are applied to a workpiece of smaller dimensions in that, for example, metal dust fed laterally to the machining location is melted by the laser treatment and bonded to the workpiece surface. This workpiece surface can then be machined by a material-removing techniques to the desired final dimension. The workpiece surfaces that are formed in these ways have desirable elasticity properties with respect to forging and show a reduced wear under the high compressive and repetitive stress loads which arise during forging.

An alternative configuration of the method provides a laser-measuring unit as the tool for machining the workpiece. The laser-measuring device, or unit, is, for example, a so-called "scanner" for detecting the 3-dimensional contours of the workpiece. In this application, the method of the invention also affords considerable advantage since, with a relatively simple and inexpensive kinematics for the control movements of the measuring machine, very precise measurements can be carried out.

A further embodiment of the invention provides that, with the measurement of the tool along an individual path segment, or trajectory segment, only relative movement of the tool and workpiece with respect to one another is effected along the linear axis. Advantageously, relative movements of the tool and workpiece with respect to one another about the pivot axes is carried out exclusively in the linking pivot movement locations connecting two respective successive trajectory, or path, segments. The result is a precise machining of the workpiece with reliable dimensional retention, since each of the pivot movements about the pivot axes is not carried out as long as the tool is in contact with the workpiece. Linear movements can be carried out by even a simple machine tool, usually with a significantly higher precision than the movements about the pivot axes, thereby leading, overall, to more precise machining results.

A further improvement in machining quality can be achieved with a simple construction of a machine tool in that between two successive trajectories, or machining path segments, only relatively small differences in adjustment are permissible.

As a result, pivotal movements—usually only about one pivot axis during a linking pivotal movement—should be limited to a maximum of 15° in angle range. Advantageously, between two successive trajectories, or path segments, each adjustment difference is in angle range of less than 10°, preferably, however, less than 7.5°. If, for certain machining regions of the workpiece, larger pivot movements are required, these can be carried out between smaller trajectory, or machine path segments.

A preferred embodiment of the invention provides that in the process groups of successive machining paths, or trajectory segments, are formed. Thus, for example, one grouping of successive neighboring machining paths, or trajectory segments, can be carried out, each of which lies in a common horizontal cross-sectional plane (height line) of the machining portion of the workpiece. Similarly, it is possible to provide a grouping in so-called "machining pockets", that is in machining regions in which the successively following machining paths, or trajectory segments, are at different height lines. Each of the linking pivot movements of the tool, which partly also can be designated as linking macros, has, according to a preferred embodiment of the method of the invention, three phases which follow one another.

A first phase comprises movement in which the attach region of the tool against the workpiece is tangential to a previous curved movement associated with a previously continuous trajectory segment, and carried out without altering the angular orientation of the tool axis. That is, it is not followed by a pivotal movement about the tool pivot axes.

A second phase comprises a movement in which the orientation of the tool axis, relative to the workpiece, is in a tangent to the connected curved path of the first phase continuously so altered that it, at the end, has the orientation of the subsequent trajectory, or machining path segment.

In this second phase, depending upon requirements, movements can be carried out about all 5 axes of the machine.

According to a further feature of the method of the invention, in the second phase, a change in orientation of the tool axis is so effected that all linear axes and all pivot axes receive a return-free movement. This type of movement or action in which the third derivative of the mathematical movement equation is constant, is carried out with a uniform machine control, and, thus, gives rise to higher machining and dimensional precision and quality. The machining, or dimensional precision, can be further increased when the change in orientation of the tool axis is so carried out that all pivot axes undergo respective minimal movements. This applies also to orientation changes of the tool axis in which only a single pivot axis is moved while the others remain fixed.

Preferably, a third phase comprising each linking pivot movement is in the form of a movement tangential to the movement in the second phase, in which the tool is moved in the direction toward the workpiece, without, thereby, altering the orientation of the tool axis. The movement in the third phase opens tangentially to the movement of the subsequent trajectory segments.

Another feature of the method of the invention is that one commences from a starting point determined in such manner that the tool and the workpiece have no collision within the trajectory or machining path segments of the link pivot movements to both sides connected therewith.

The start point can, for example, be predetermined by a user. The further determination of the machining path or trajectory segments is effected basically under the premises of freedom from collision, which is that condition with the highest priority, since the desired machining quality can only be reached when the tool, including its holder, cannot collide with the workpiece in the movement along the tool machining path or trajectory.

According to a feature of the method, a further condition is that the machining path segments or trajectory segments each be as long as possible. That is that the segments be of a maximum length which is permissible without orientation changes of the tool axis. The fewer the time-consuming link pivotal actions which are required or provided, the greater the speed with which the machining can be carried out.

A further preferred embodiment of the invention provides that the spacing of the starting points of neighboring trajectories should be kept to a minimum. That is, the starting points of neighboring trajectory segments which lie respectively in neighboring horizontal cross-sectional planes which can be approximated by straight lines or by slightly curved lines. This leads to a highly uniform contour of the workpiece, based upon the laminar grouping of trajectory segments. For a casting mold which is machined by milling, such a grouping can contribute to improved flow properties of the casting material which can flow along the macro structure extending from the starting point in the workpiece.

Advantageously, the positions of the starting points can follow a predetermined curved pattern. This predetermined curved pattern is described in the present system also as a segment boundary or limit, since the machining path segments or curves abut or adjoin each other along this line or curve. The formation of a segment boundary or limit has the afore-described positive effect on the uniformity of the finish-machined surface which significantly improves the optical quality, impression or appearance.

In a further feature of the method of the invention, it is provided that the angle differences of the orientation of the tool axis with respect to prior trajectories or machining path segments should not exceed a predetermined value. These angular differences are preferably held as small as possible so that no dimensional deviations are produced in the machine path segments which follow one another during the machining as a result of machining-specific deviations from predetermined trajectory or machining path patterns. According to further preferred embodiments of the method of the invention, the orientation of the tool axis within a path segment or trajectory follows a manual input. The setting or adjustment of the tool results from a prior calculation of a collision-free path or trajectory pattern. The segment limits are then forced by the input requirements which ensure that between two neighboring segment limits, no excessive adjustment differences can be maintained. If, nevertheless, large angle repositioning is required, it can be carried out by establishing corresponding shorter path segments or trajectories.

Preferably, the beginning of the attack of the tool in the workpiece forms the starting point for the first machining path segment or trajectory, that is, the sorting and grouping of the path segments is orientated, based upon the machining sequences following the commencement of machining by the tool. The starting point for the first machining path segment or trajectory segment can be devised based upon a manual requirement. It is also possible to determine the starting point by means of an algorithm which proposes an optimal starting point for the first machining path segment or trajectory segment.

According to a further preferred embodiment method of the invention, the machining path or trajectory segments which follow one another are respectively sorted basically such that the spacing between the end points of each machining path segment or trajectory segment to the starting point of the next following machining path or trajectory segment is a minimum. This machining method includes a so-called "zig-zag mode" in which the machining is carried out in directions which are opposite each other in successive trajectories. In this manner the so-called "rapid return" or set movements of the tool, during which the tool is not engaged with the workpieces, take place over relatively short segments so that the overall machining time can also turn out to be relatively short. According to an alternative embodiment of the method of the invention, the machining path segments or trajectories which follow one another also have been so sorted that the change in orientations of the tool axis is kept to a minimum. In this machining method, the attack regions of the tool, in all cases with machining path or trajectory segments which follow one another, have the same machining direction; otherwise relatively long return movements by the end point of one machining path or trajectory segment and the starting point of the next path segment will result. The quality of the machining results can generally, in many cases, turn out better with the so-called "zig-zag" mode.

BRIEF DESCRIPTION OF THE DRAWING

The invention is described in greater detail based upon embodiment and with reference to the accompanying Figures.

SPECIFIC DESCRIPTION

The method of the invention for controlling relative movements of a tool against a workpiece is described in connection with FIGS. 1 to 12 wherein the same parts have basically been indicated by the same reference characters and at least in part will not be described repeatedly.

Figure 1:
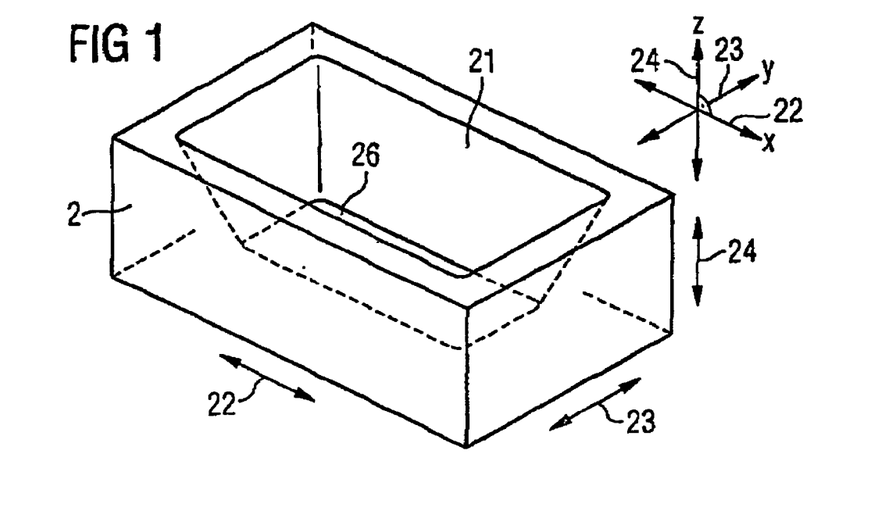
FIG. 1 shows in a perspective schematic drawing a workpiece with a target control.

FIG. 1 shows in a perspective schematic illustration a cube-shaped workpiece 2 which has been provided with a target contour 21 in the form of a trough-shaped or trough-like cavity. This workpiece 2 is required for example for a tool forming construction in which a metal block with a recess or depression forms the positive mold or die for a press die or deep drawing in die or mold. The workpiece 2 is typically formed initially in a casting process with a desired coarse contour so that in a subsequent milling process it can be machined to the exact contour which must match the desired contour at low tolerance. In the material-removal milling process, it is usually not necessary to remove a number of one layers but rather in the first machining operation, the exact desired dimensions can be produced in the workpiece. This requires, in addition, that a high precision be available for five axis milling to ensure the desired dimensions of the finished workpiece 2. This precision is not possible with the linear and pivotal movements of many machine tools heretofore because of their high inertias and unavoidable tolerances in the tool field operations.

Below, by way of example, a 5-axis relative movement between tool and workpiece 2 is described in which the workpiece 2 can be shifted along three mutually perpendicular linear axes 22, 23, 24. The fourth and fifth axes are pivotal axes about which the tool, in the present embodiment a milling cutter 4 (see FIG. 3), is pivotable.

Figure 3:
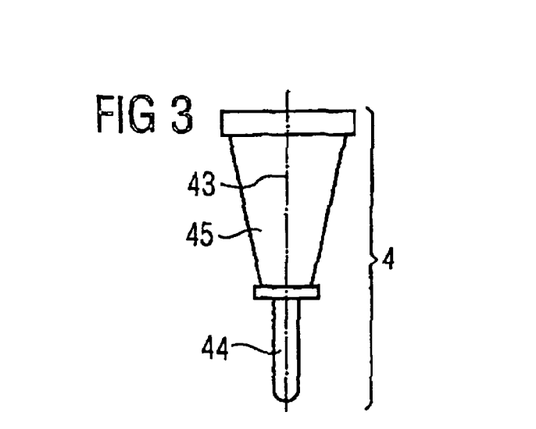
FIG. 3 shows a milling tool in a form intended to illustrate the basics of the invention.

FIG. 3 shows the basic characteristic of a milling cutter which can be used as an example of a tool for the purpose of the present invention.

This milling tool 4 has an elongated cylindrical milling head 44 whose attack region can be rounded in the illustrated configuration. The attack region of the milling head 44 can also be desired, be sharp edged. The milling head 44 is clamped centrally in a tool roller 45 which can rotate during the milling process together with the milling head 44 round the tool axis 43. For the pivotal movement described in te present application, about pivot axes 41 and 42 which are oriented at an angle to one another (FIGS. 9 and 10), a corresponding movement of the tool axis 43 is meant.

The three linear axes 22, 23, 24, corresponding to those shown in the embodiment illustrated in FIG. 1 are each parallel to the workpiece edges so that the first linear axis 22 is parallel to the x axis for the better orientation of the illustrated coordinate system and also parallel to a horizontal edge of the cube shape workpiece 2. The second linear axis 23 is perpendicular to the first linear axis 22, lies parallel to the y axis and is parallel to a second horizontal workpiece edge. The third linear axis 24 is perpendicular to the first and second linear axis 22, 23 and parallel to the z axis and parallel to a vertical edge.

Figure 2:
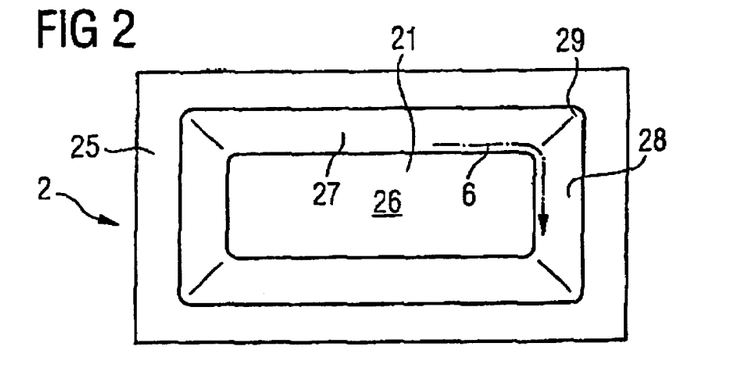
FIG. 2 shows a plan view of the workpiece corresponding to FIG. 1.

FIG. 2 shows a schematic plan view of a flat upper side 25 of the cubicle workpiece 2 according to FIG. 1 and which has been provided with the target contour 21 in the form of a trough-shaped depression. As is clear from FIGS. 1 and 2, the desired target contour 21 can only be completely machined with a mill rotating around a vertical rotation axis when the holder of the mill is sufficiently compact or when the free end of the mill is sufficiently long. In these cases on the other hand there is the danger of an elastic deformation of the milling head which can give rise to undesirable dimensional deviations upon the machining of the target contour 21 of the workpiece 2.

The deeper regions and especially the bottom region 26 at its transitions to the inclined descending wall segments of the trough-shaped target contour 21 cannot be machined from a certain steepness of the angle without a collision between the tool holder of the milling tool and the workpiece with higher sections of the wall.

When in the machining of a low lying wall segment in the vicinity of the bottom region 26, the rotation axis of the milling tool together with the tool holder is adjusted to have an angular position so that between the rotation axis or tool axis of the milled and the surface of the target contour 21 an increased angle is included, a collision of the tool holder with a wall segment can be excluded and a tight curve of the target contour 21 can be made.

This problem will be clearer with respect to FIG. 2 in which a short section of the tool path 6 has been indicated by dot-dash lines. This runs along a region of the bottom 26 adjacent to a first inclined wall segment 27, then follows a relatively tight radius 29 and then runs further along a second wall segment 28 at the same horizontal height of the workpiece 2. An adjustment of the rotating tool about a right angle against the surface of the first wall segment 27 causes a collision with the upper region of the second wall segment 28 as soon as the milling head in following the tool path 6 comes into the region of the radius 29.

A collision of the tool holder with the workpiece 2 can be avoided in that the milling tool can be operated with an inclined orientation which includes an angle with respect to the first wall segment 27 as well as with the second wall segment 28 and which is approximately the same angle in both cases. In any case, the tool holder in this situation can collide with the next adjacent wall segment to the extend that the angular setting of the axis of the tool holder is not altered during the operation.

A solution to this collision problem can lie in machining the workpiece with a 5-axis simultaneous milling program which can be carried out on many previously provided machine tools which can attack the problem with a high degree of precision. A solution to the problem in accordance with the invention resides in a machining method whereby the entire tool path or trajectory sets for machining the target contour 21 is subdivided into a plurality, optionally into a multiplicity, of path or trajectory segments which are carried out with fixed tool settings in a segment-wise manner. In the tracking of these trajectory segments, the rotary tool is in engagement with the workpiece 2. An adjustment of the rotating tool about the tool pivot axis is effected in this method only for the so-called link pivot movements or connection pivot movements, designated herein also as link or linking macros, at which time the tool does not find itself in engagement with the workpiece. The positions of the link macros can be previously established manually or can be determined by an automatic calculation whereby the yield collision-free trajectory segments which are as long as possible considering the contour to be machined. This method according to the invention is described below with reference to FIG. 4.

Figure 4:
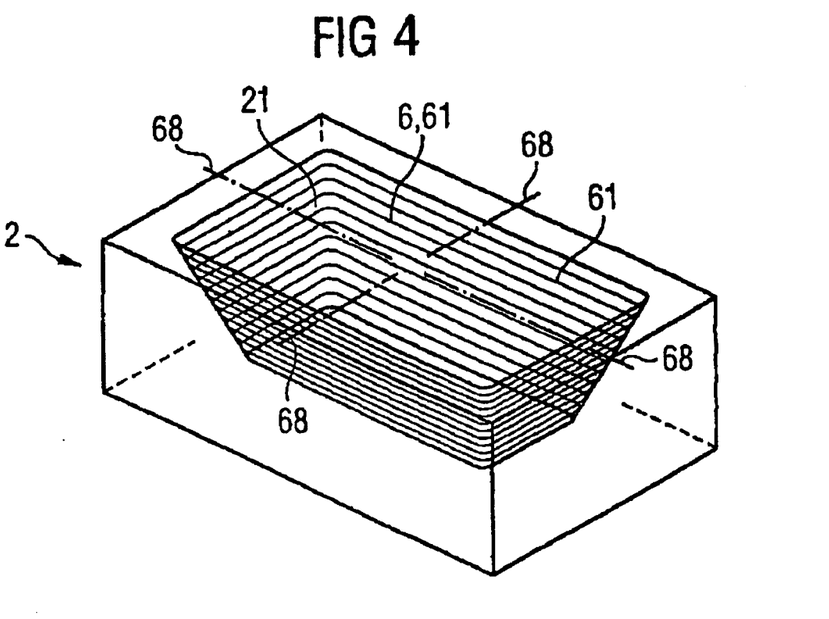
FIG. 4 is a prospective view of the workpiece and the segment boundaries provided therefor.
Figure 5:
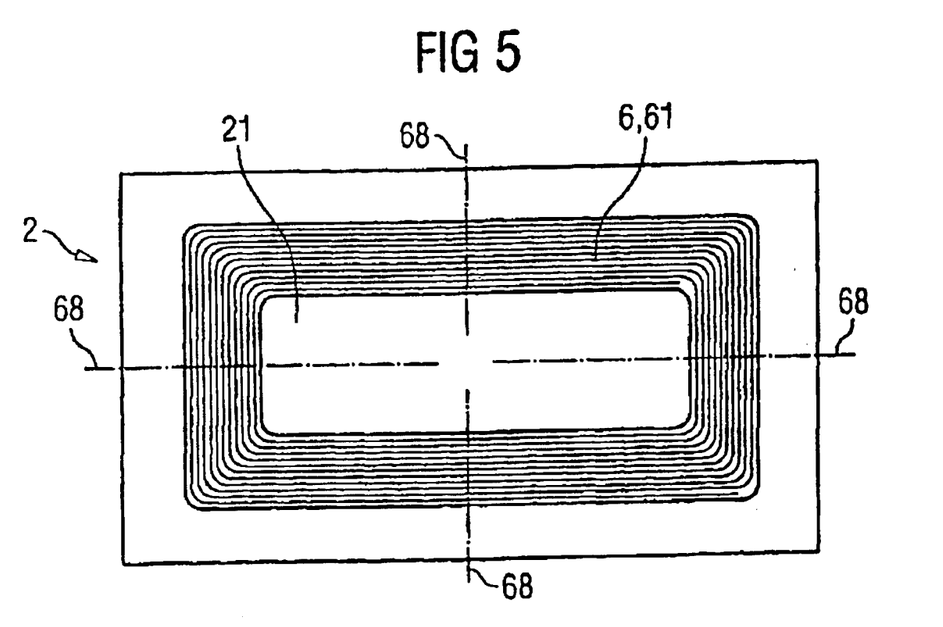
FIG. 5 shows a plan view of the workpiece according to FIG. 4.

FIGS. 4 and 5 show respective schematic views of the workpiece 2 corresponding to FIG. 1 whereby FIG. 4 is a perspective view and FIG. 5 is a plan view. The tool trajectory 6 is subdivided within the trough-shaped target contour 21 into a number of mutually parallel trajectory or path segments 61. Segment boundaries 68 at which neighboring trajectory segments adjoin one another have been indicated as lines which lie perpendicular to the wall segments 27, 28.

The segment boundaries 68 in the illustrated embodiment can be manually set by the user so that the neighboring path or trajectory segments 61 adjoin one another. They need not necessarily overlap respective neighboring path segments 61 or precisely adjoin them as has been illustrated in FIGS. 4 and 5, but can be shifted optionally relative to them. In any case, for a symmetric workpiece contour as shown, an exactly adjoining arrangement of the segment boundary 68 or regions is sensible since, in this manner, respective parallel feed movements of the rotating tool can be provided for the successive trajectory segment 61 lying one above the other and thus a homogeneous surface structure can be assured red after the machining. Such a homogeneous surface structure can be desirable, for example, to achieve better flow properties of a cast tool based upon the better micro structure of the workpiece surface. In addition, such homogeneous workpiece surface can be especially of interest because of the optical qualities of the surface. In this case, the described selection of segment boundaries 68 can provide desirable solution.

Figure 6:
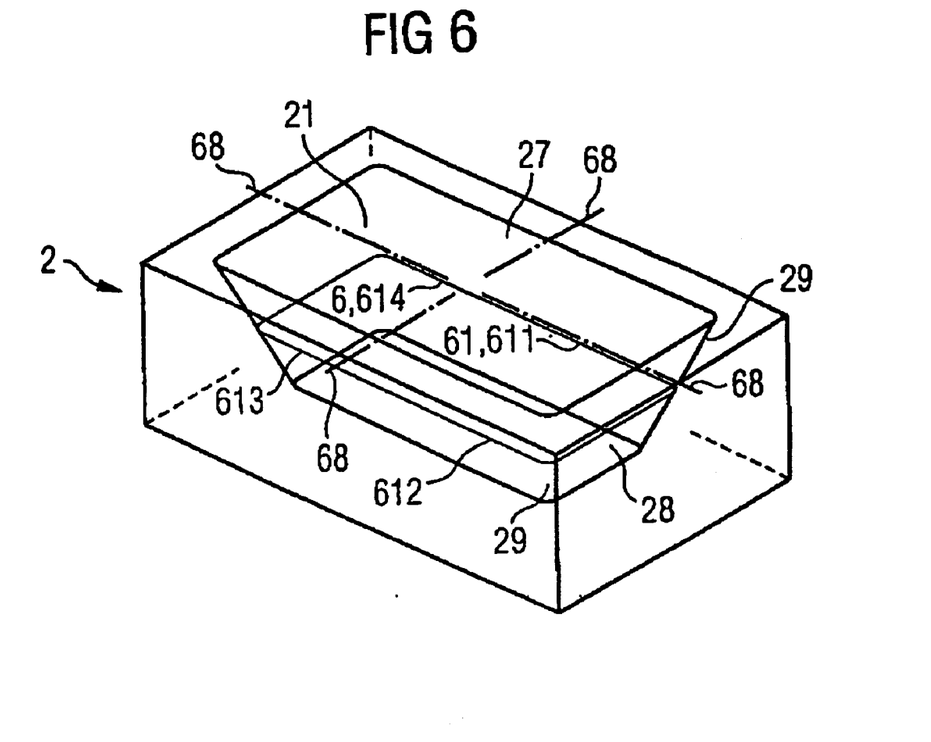
FIG. 6 shows a prospective illustration of the workpiece for clarifying a continuous machining operation.
Figure 7:
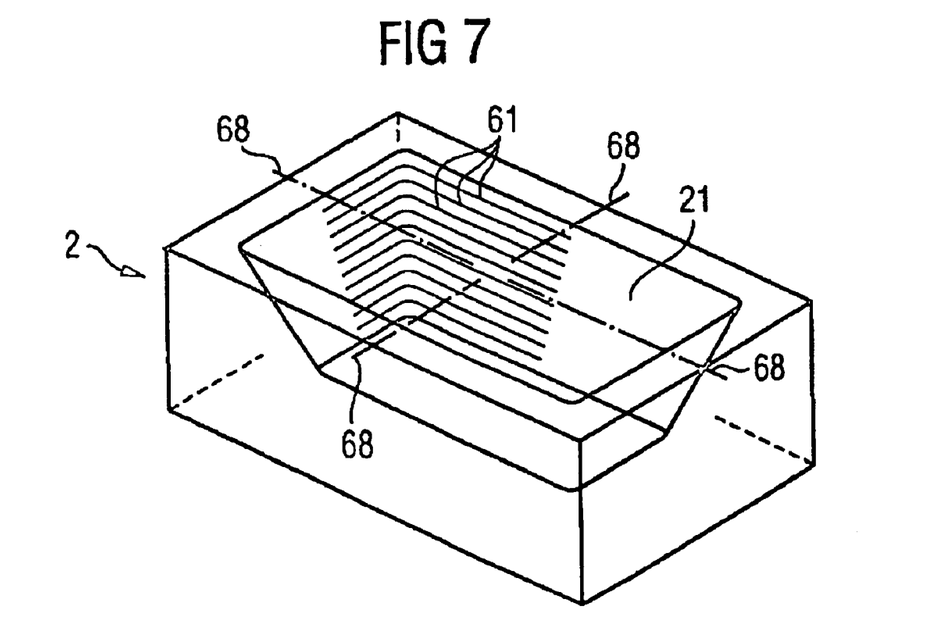
FIG. 7 shows a prospective view of the workpiece to make clear a pocket-like machining.
Figure 8:
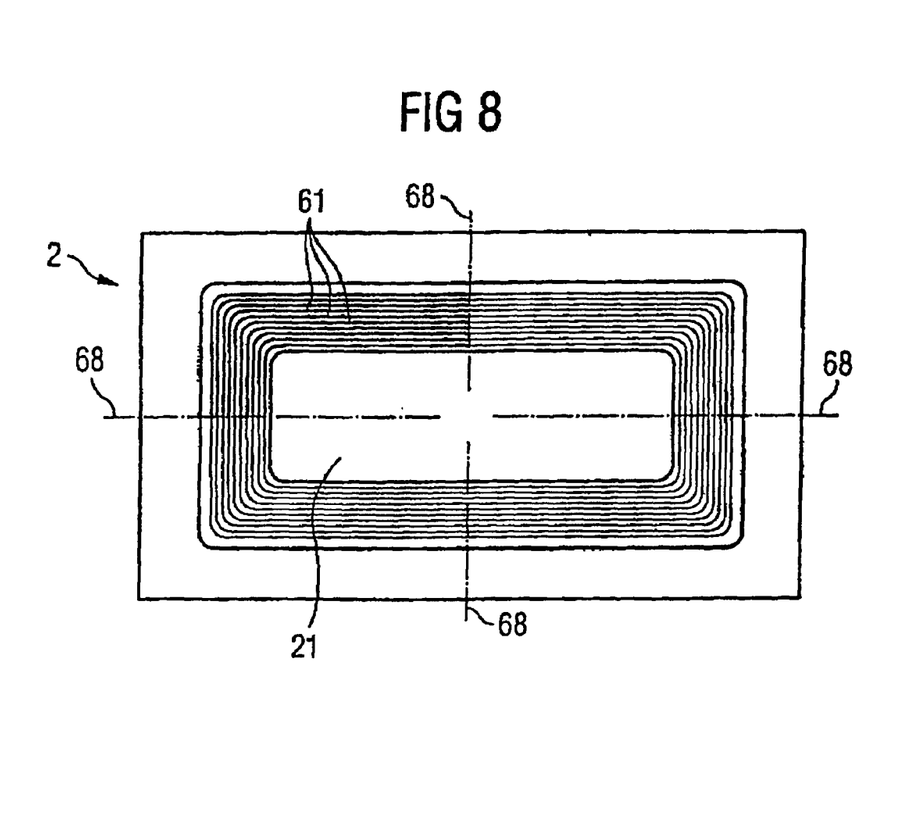
FIG. 8 shows a plan view of the workpiece according to FIG. 7.

As can be seen from FIGS. 6 through 8, which are respectively perspective (FIGS. 6 and 7) and a plan 6 (FIG. 8) of the workpiece 2 with the trough-shaped contour 21, the sorting of the trajectory segments 61 can be selectively of one of two different types.

FIG. 6 shows a sorting with a tool trajectory 6 running in the feed direction of the rotating tool, whereby successive trajectory segments 61 each directly adjoin one another at the segment boundaries 68, linking macros 62 connect them together, that is, there are pivotal linking movements of the tool to connect the directly adjoining path segments. The trajectory 6 is thus divided into circumferential trajectories at different height levels. In the illustrated embodiment, each height level is subdivided into four trajectory segments 61, each covering a half of a first straight wall segment 27, a second straight wall segment 28 adjoining the segment 27 and the radius 29 which forms a junction between the straight wall segments. A first, second, third and forth trajectory segment 611, 612, 613 614 are all at a common height level of the target contour. A first target segment is then located at an underlying fourth height level.

This machining strategy is especially advantageous when it is to be carried out on machines which have relatively good dynamic characteristics with continuous machining. The machined trajectory segments 61 can be relatively large. The connecting or linking pivotal movements of the rotating tool can be carried out at the segment boundaries relatively rapidly.

FIGS. 7 and 8 disclose the sorting of the target segment 61 transversely to the feed direction which is referred to herein as to "pocket-type" sorting in this case, each target segment 61, which is separated by a neighboring segment boundary 68, is assembled to a group of target segments lying one above the other. Such a machining strategy is especially advantageous when machining is carried out on machine tools with dynamic characteristics which are unsatisfactory or when the target segments 61 are relatively short, so that the requisite high speed movements can be carried out more rapidly than the movement in the linking macro. The described machining strategy can also be advantageous when an orientation between uni-directional and counter-directional feed is acceptable (so-called "zig-zag") movement. The pivot axes of the machine tool are used to a lesser extent in this case than in the previously described machining method.

Figure 9:
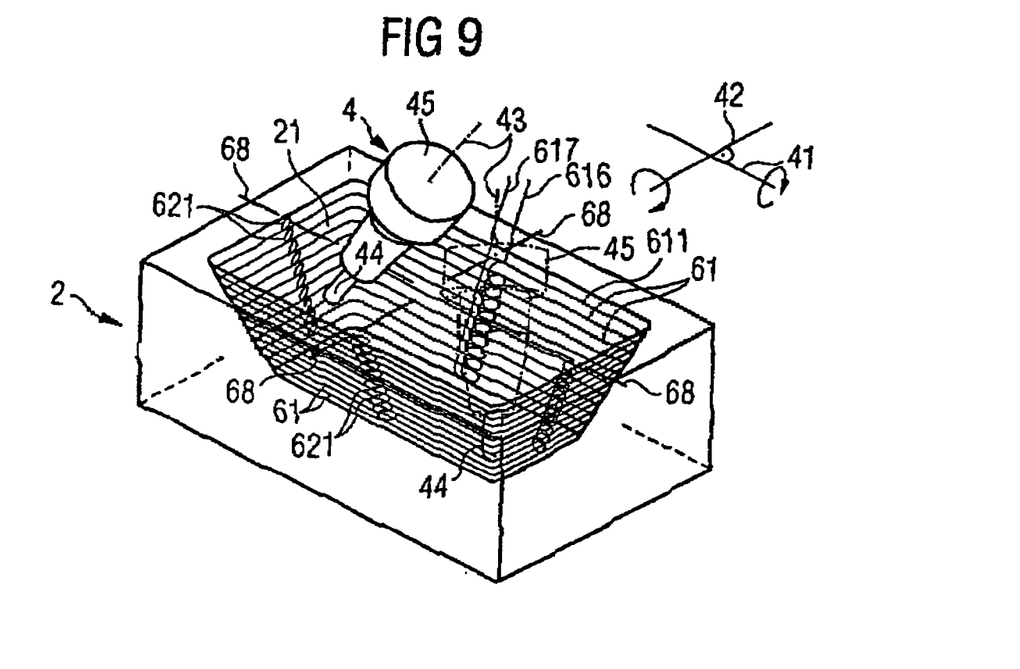
FIG. 9 shows a prospective view of the workpiece to explain the link macros with a continuous machining operation.
Figure 10:
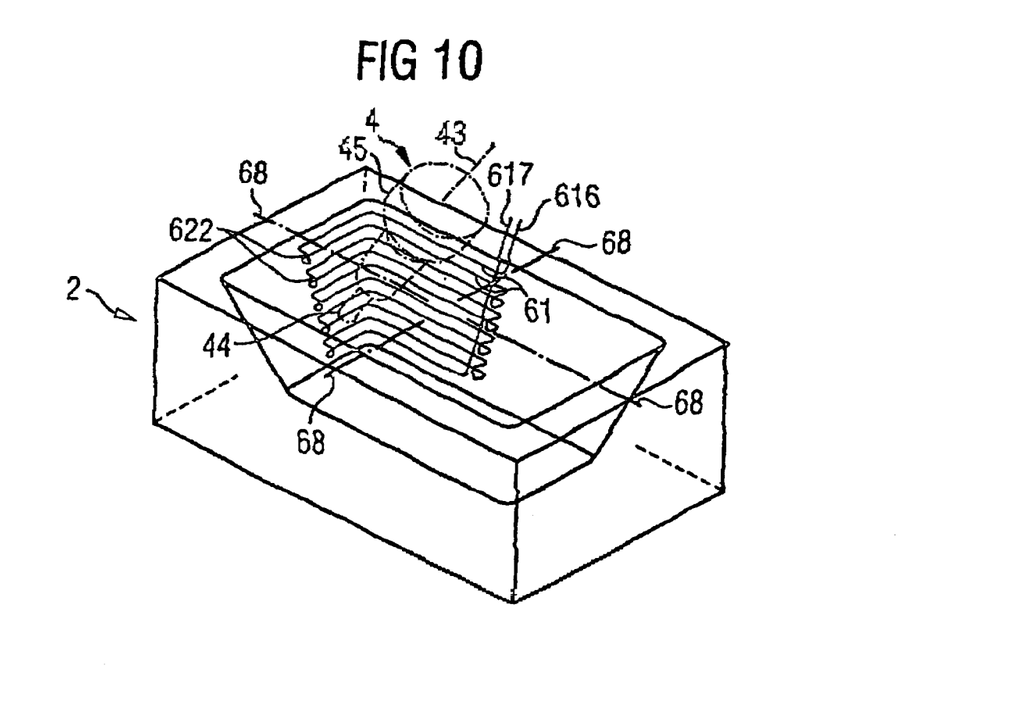
FIG. 10 shows a perspective view of the workpiece to explain the linking macros for pocket-wise machining.

As can be seen from the perspective illustrations of FIGS. 9 and 10, the linking macros 62 are the linking pivotal movements for the movement of the rotatable tool—hitherto described by way of example of the milling cutter 4—and are described in greater detail between successive target segments 61 and which basically are combination pivot movements of the tool 4 and the milling head 44 about their first and second pivot 41, 42. The two pivot axes 41, 42 which are preferably oriented perpendicularly to one another have been symbolically indicated in FIG. 9. Thus, FIG. 9 shows the first linking macro 621 between neighboring target segments 61 in the feed-direction machining alternative (compare FIG. 6). FIG. 10 shows the second linking macro 622 between neighboring target segments 61 in pocket-like machining (zig-zag mode, compare FIGS. 7, 8). From FIGS. 9 and 10 respectively, starting segments 616 and following segments 617 are shown, between which the milling head 44 does not lie in contact with the workpiece 2. The starting segment 616 characterized the adjustment movement of the milling head 44 with respect to the workpiece 2 and shows the communication to the first point of attack of the target 6 and simultaneously to the first target segment 611. The outlet segment 617 characterizes the path of movement of the milling head 44 after traversing the target 6 and thus following the machining of the complete target contour or a pocket-shaped section thereof.

Figure 11:
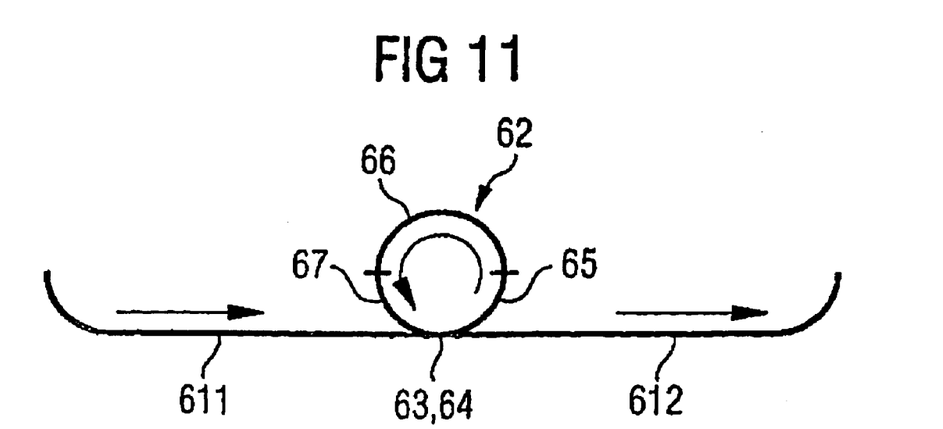
FIG. 11 shows a section of a tool path corresponding to FIG. 9.
Figure 12:
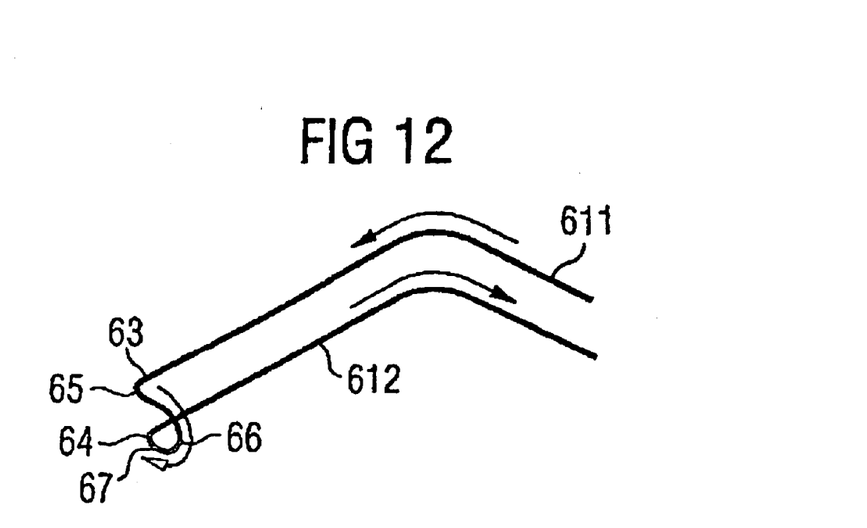
FIG. 12 shows a section of a tool path corresponding to FIG. 10.

From FIGS. 11 and 12, the connecting macros 62 are described with respect to their details, whereby FIG. 11 shows a portion of a tool path 6 corresponding to FIG. 9, and FIG. 12 shows a section of a tool path 6 corresponding to FIG. 10 in greater detail. Each linking macro 62 has three phases in turn, whereby a first phase 65 describing a curved path of the milling cutter 44 which extends tangentially from an end point 63, for example, of the first target segment 611 in a curved movement. The end point 63 of the first path segment 611 is the last point at which the milling head 44 lies in a chip-removal attack upon the workpiece 2. During the first phase 65, the cutting head 44 of the tool is swung in a curved movement out of contact with the workpiece 2. The first phase 65 can thus be characterized as a removal motion of the rotating tool whereby the tool 4 is displaced out of engagement with the workpiece.

A second phase 66 can be designated as a so-called "re-orientation" phase since, during this phase, the tool 4 is given another angular position as is required for the subsequent second target segment 612. The first phase 65 of the linking macro 62 opens tangentially into the curved movement of th second phase 66 which opens tangentially into the third phase 67. This third phase 67 opens again tangentially into the respective grouping of the second path segments 612 which directly follow the first path segment 611 of the target segments 61. The third phase can be characterized as a starting phase since during it, the milling head 44 is brought into contact with the workpiece at the starting point 64 of the second target segment 612 and, therefore, is the first point of attack of the milling head with the workpiece 2 of this second target segment 612.

The invention claimed is:

1. A method of controlling relative movements of a tool with respect to a workpiece in which a tool axis can be swung or shiftable in all spatial dimensions for the material-removal machining of the workpiece and in which a desired target contour of the workpiece is produced by a sequence of relative movements along a tool trajectory of the tool wherein the tool trajectory is subdivided into a multiplicity of target segments along which the tool is in engagement with the workpiece such that the orientation of the tool axis is consistent within a target segment, while the orientation of the tool axis is variable over the entire tool trajectory, and a respective end point of a target segment is connected by a linking pivot movement, during which the tool does not engage the workpiece and in which the orientation of the tool axis is altered, with a starting point of a further target segment.

2. The method according to claim 1 wherein the relative movement of the tool with respect to the workpiece is carried out by linear movements of the workpiece in three different longitudinal directions together with pivotal movements of the tool about two different pivot axes.

3. The method according to claim 1 wherein the relative movements of the tool with respect to the workpiece are carried out by linear movements of the workpiece in two different longitudinal directions, and pivotal movements of the tool about two different pivotal axes and linear movement in a third longitudinal direction.

4. The method according to claim 1 wherein the relative movement to the tool with respect to the workpiece is carried out by linear movement of the tool in three different longitudinal directions together with pivotal movements of the tool about two different pivot axes.

5. The method according to claim 1 wherein the relative movement of the tool with respect to the workpiece is carried out by linear movement of the workpiece in two different longitudinal directions and pivotal movements of the workpiece about two different pivot axes.

6. The method according to claim 1 wherein the relative movement of the tool with respect to workpiece is carried out by pivotal movements of the workpiece about at least three linear shiftable suspensions of the workpiece.

7. The method according to claim 1 wherein the tool is a milling cutter.

8. The method according to claim 1 wherein the tool is a laser head.

9. The method according to claim 1 wherein the tool is a laser measuring device.

10. The method according to claim 1 wherein in the movement of the tool along an individual target segment, only relative movement of the tool and workpiece to one another is effected along the linear axes.

11. The method according to claim 1 wherein, exclusively in the linking pivotal movements for linking to respectively following target segments, relative movement of the tool and the workpiece relative to one another about the pivot axes is carried out.

12. The method according to claim 1 wherein between two subsequent target segments, only a small adjustment difference is permissible.

13. The method according to claim 1 wherein groups of respective neighboring target segments follow one another.

14. The method according to claim 13 wherein each group of neighboring target segments following one another, lie on a common horizontal cross-sectional plane of the workpiece.

15. The method according to claim 1 wherein the linking pivotal movement of the tool has three successive phases.

16. The method according to claim 15 wherein a first phase has a movement in which the tool is removed with a tangential tool movement from the workpiece without, thereby, changing the orientation of the tool axis.

17. The method according to claim 15 wherein a second phase has a movement in which the orientation of the tool axis of the tool is continuously altered in a tangential subsequent curved movement so that at the end it assumes the orientation of the following target segment.

18. The method according to claim 15 wherein the change in orientation of the tool axis is such that all linear axes, and all pivotal axes are displaceable with a no-return movement.

19. The method according to claim 15 wherein the change in orientation of the tool axis is so carried out that all pivot axes have respective minimum movements.

20. The method of claim 15 wherein a third phase has a movement in which the tool is displaced in the direction of the workpiece in a curved motion tangentially connected to the next following target segment without thereby altering the orientation of the tool axes.

21. The method according to claim 1 wherein starting from a starting point a target segment is determined in such manner that the tool and the workpiece can undergo movement within the target segment and the linking pivot movements at opposite ends thereof without collisions.

22. The method according to claim 1 wherein a target segment with the longest possible length is used.

23. The method according to claim 1 wherein the spacing of the starting points of neighboring target segments is minimal.

24. The method according to claim 1 wherein the position of the starting points follow a predetermined curved pattern.

25. The method according to claim 1 wherein the angle differences of the orientation of the tool axis from a preceding target segment does not exceed a predetermined angle.

26. The method according to claim 1 wherein the orientation of the tool axis within a target segment is set based upon a manual input.

27. The method according to claim 1 wherein the beginning of the attack of the tool on the workpiece forms the starting point for the first target segment.

28. The method according to claim 27 wherein the starting point for the first target segment is predetermined by a user.

29. The method according to claim 1 wherein the subsequently machined target segment is basically so sorted that the distance between the end point, or a target segment, to the starting point of the next following target segment is minimal.

30. The method according to claim 1 wherein the subsequently machined target segments are basically so sorted that the changes in the orientation of the tool axes are minimal.

* * * * *